(12) United States Patent
Hoyland et al.

(10) Patent No.: US 7,529,812 B2
(45) Date of Patent: May 5, 2009

(54) SOCKET CONNECTIONS OVER A SERIAL LINK

(75) Inventors: Jeremy Hoyland, Ramat Bet Shemesh (IL); Omer Pomerantz, Herzelia (IL); David Glushko, Herzelia (IL); Rui-Tao Max Mu, Beijing (CN)

(73) Assignee: Sun Microsystems, Inc., Santa Clara, CA (US)

( * ) Notice: Subject to any disclaimer, the term of this patent is extended or adjusted under 35 U.S.C. 154(b) by 877 days.

(21) Appl. No.: 11/011,432

(22) Filed: Dec. 14, 2004

(65) Prior Publication Data

US 2005/0198308 A1 Sep. 8, 2005

Related U.S. Application Data

(60) Provisional application No. 60/542,958, filed on Feb. 9, 2004.

(51) Int. Cl.
*G06F 15/16* (2006.01)
(52) U.S. Cl. .................. 709/219; 709/217; 709/218; 709/231; 709/246; 709/247
(58) Field of Classification Search ................ 709/217, 709/218, 219, 231, 246, 247
See application file for complete search history.

(56) References Cited

U.S. PATENT DOCUMENTS 6,212,560 B1 * 4/2001 Fairchild .................... 709/223
6,434,620 B1 8/2002 Boucher et al.
7,200,679 B2 * 4/2007 Landfeldt et al. ........... 709/246

OTHER PUBLICATIONS

European Search Report, Application No. 0520753.0-2211, Mailed Nov. 23, 2005.
Murali Rangarajan, et al.: "TCP Servers: Offloading TCP Processing in Internet Servers. Design, Implementation, and Performance" 'Online! Mar. 2002, XP002286342 Rutgers University Retrieved from the Internet URL: http://discolab.rutgers.edu/split-os/dcs-tr-481.pdf.
Haas Z J; Warkhedi A.: "The design and performance of Mobile TCP for wireless networks" Journal of High Speed Networks, vol. 10, No. 3, 2001, pp. 187-207, XP002353175 IOS Press Netherlands.

* cited by examiner

*Primary Examiner*—Jinsong Hu
(74) *Attorney, Agent, or Firm*—Meyertons Hood Kivlin Kowert & Goetzel, P.C.

(57) ABSTRACT

A method for communication includes coupling a client device to communicate with a host computer over a serial link. Responsively to a call from a client application running on the client device, the client device submits a request over the serial link to the host computer to open a proxy connection for communication between the client application and a server application. Responsively to the request, the host computer creates a socket for communication with the server application, so as to establish the proxy connection via the socket. The host computer and client device convey data between the server application and the client application over the serial link using the proxy connection.

22 Claims, 3 Drawing Sheets

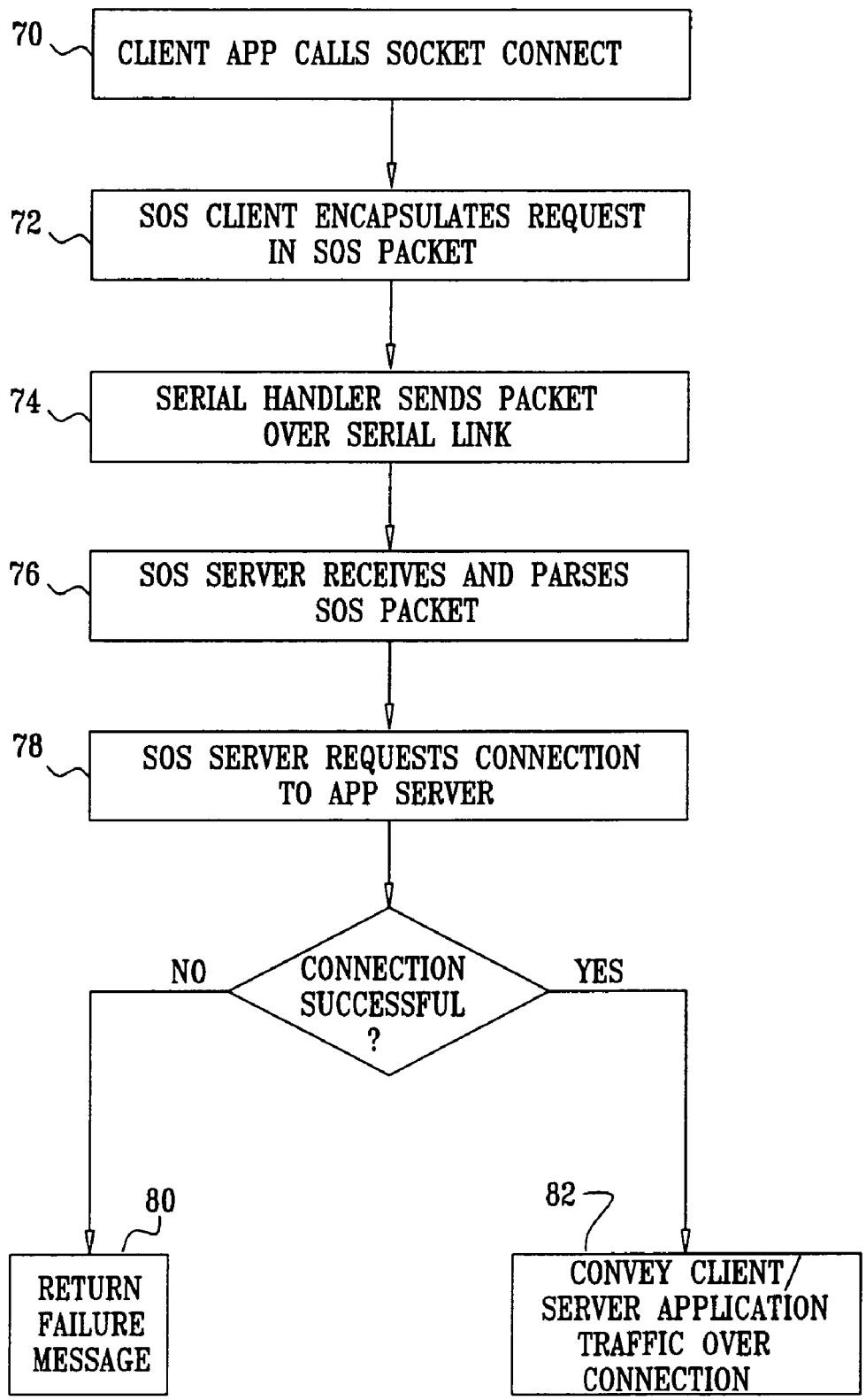

SOCKET CONNECTIONS OVER A SERIAL LINK

CROSS-REFERENCE TO RELATED APPLICATION

This applications claims the benefit of U.S. Provisional Patent Application 60/542,958, filed Feb. 9, 2004, which is incorporated herein by reference.

FIELD OF THE INVENTION

The present invention relates generally to computer systems and software, and specifically to methods and devices for socket-based communications between computers over a serial link.

BACKGROUND OF THE INVENTION

A socket is one endpoint of a two-way communication link between two programs or processes. Typically, in network applications, sockets are implemented at the transport layer, and require underlying support of a complete networking protocol stack, including physical layer, data link layer and network layer protocols. For example, Hypertext Transfer Protocol (HTTP) communications use Transmission Control Protocol (TCP) sockets, which operate over a complete Internet Protocol (IP) infrastructure. Operation of the protocol stack on a host computer typically requires that the computer operating system allocate various resources for the purpose, including native threads, synchronization primitives and memory.

Small computing devices, such as mobile and embedded systems, may need sockets for some applications, but may not have the resources necessary to support a complete protocol stack. The communication capability of such devices may be limited (at least for the purposes of the applications in question) to a simple serial link to a host computer.

SUMMARY OF THE INVENTION

Embodiments of the present invention enable a client computing device to establish socket connections over a serial link, using a novel "Socket over Serial" (SoS) protocol, which does not require the support of a networking stack. Socket requests by client applications running on the client device are passed over the serial link to the host using the SoS protocol. The host serves as a socket proxy for the client device. In other words, the host parses and processes the client requests, and then uses its own operating system to make the socket connection to the server application that has been requested by the client application. The host sends responses from the server application back to the client device over the serial link using the SoS protocol. The proxy operation of the host is transparent to the client and to the server, which may thus communicate with one another (through the host) as though there were a direct network connection between the client and server.

In some embodiments of the present invention, the client uses the SoS protocol to communicate, via the host, with applications running on remote servers, with which the host may communicate over a network. In other embodiments, the client communicates in this manner with local server programs running on the host itself. In the context of the present patent application and in the claims, the term "server" refers to all server applications, whether local or remote, unless specified otherwise.

There is therefore provided, in accordance with an embodiment of the present invention, a method for communication, including:

coupling a client device to communicate with a host computer over a serial link;

responsively to a call from a client application running on the client device, submitting a request over the serial link from the client device to the host computer to open a proxy connection for communication between the client application and a server application;

responsively to the request, creating a socket on the host computer for communication with the server application, so as to establish the proxy connection via the socket; and conveying data between the server application and the client application over the serial link using the proxy connection.

In a disclosed embodiment, creating the socket includes opening a Transmission Control Protocol (TCP) socket, and conveying the data includes conveying a Hypertext Transfer Protocol (HTTP) packet through the TCP socket. Typically, the method requires no more than a single program thread to run on the client device, and conveying the data over the serial link includes transmitting and receiving the data without using a networking protocol stack, such as a TCP stack, on the client device.

In some embodiments, creating the socket includes creating the socket for communication between a proxy server process running on the host computer and an application process of the server application that is running on the host computer. In other embodiments, creating the socket includes creating the socket for communication over a network between the host computer and a server on which the server application is running.

There is also provided, in accordance with an embodiment of the present invention, apparatus for communication, including:

a client computing device, which includes a first serial port and is adapted to run a client application and, responsively to a call made by the client application, to submit a request via the first serial port to open a proxy connection for communication between the client application and a server application; and a host computer, which includes a second serial port coupled to the first serial port by a serial link, and which is adapted, responsively to the request submitted by the client computing device, to create a socket on the host computer for communication with the server application, so as to establish the proxy connection via the socket, and to convey data between the server application and the client application over the serial link using the proxy connection.

There is additionally provided, in accordance with an embodiment of the present invention, a computer software product for use on a client computing device, which is adapted to be connected by a serial link to a host computer, the product including a computer-readable storage medium in which program instructions are stored, which instructions, when read by the client computing device, cause the client computing device to submit a request via the serial link, in response to a call made by a client application running on the client computing device, to open a proxy connection for communication between the client application and a server application, thereby causing the host computer to create a socket on the host computer for communication with the server application so as to establish the proxy connection via the socket, the instructions further causing the client computing device to receive data from the server application over the serial link using the proxy connection, and to convey the data to the client application.

There is further provided, in accordance with an embodiment of the present invention, a computer software product for use on a host computer, which is adapted to be connected by a serial link to a client computing device, the product including a computer-readable medium in which program instructions are stored, which instructions, when read by the host computer, cause the host computer to create a socket for communication with a server application in response to a request received from the client computing device over the serial link to open a proxy connection for communication between a client application on the client computing device and the server application, the instructions further causing the host computer to convey data between the server application and the client application over the serial link using the proxy connection via the socket.

The present invention will be more fully understood from the following detailed description of the embodiments thereof, taken together with the drawings in which:

BRIEF DESCRIPTION OF THE DRAWINGS

FIG. 3 is a flow chart that schematically illustrates a method for socket-based communication, in accordance with an embodiment of the present invention.

DETAILED DESCRIPTION OF EMBODIMENTS

Figure 1:
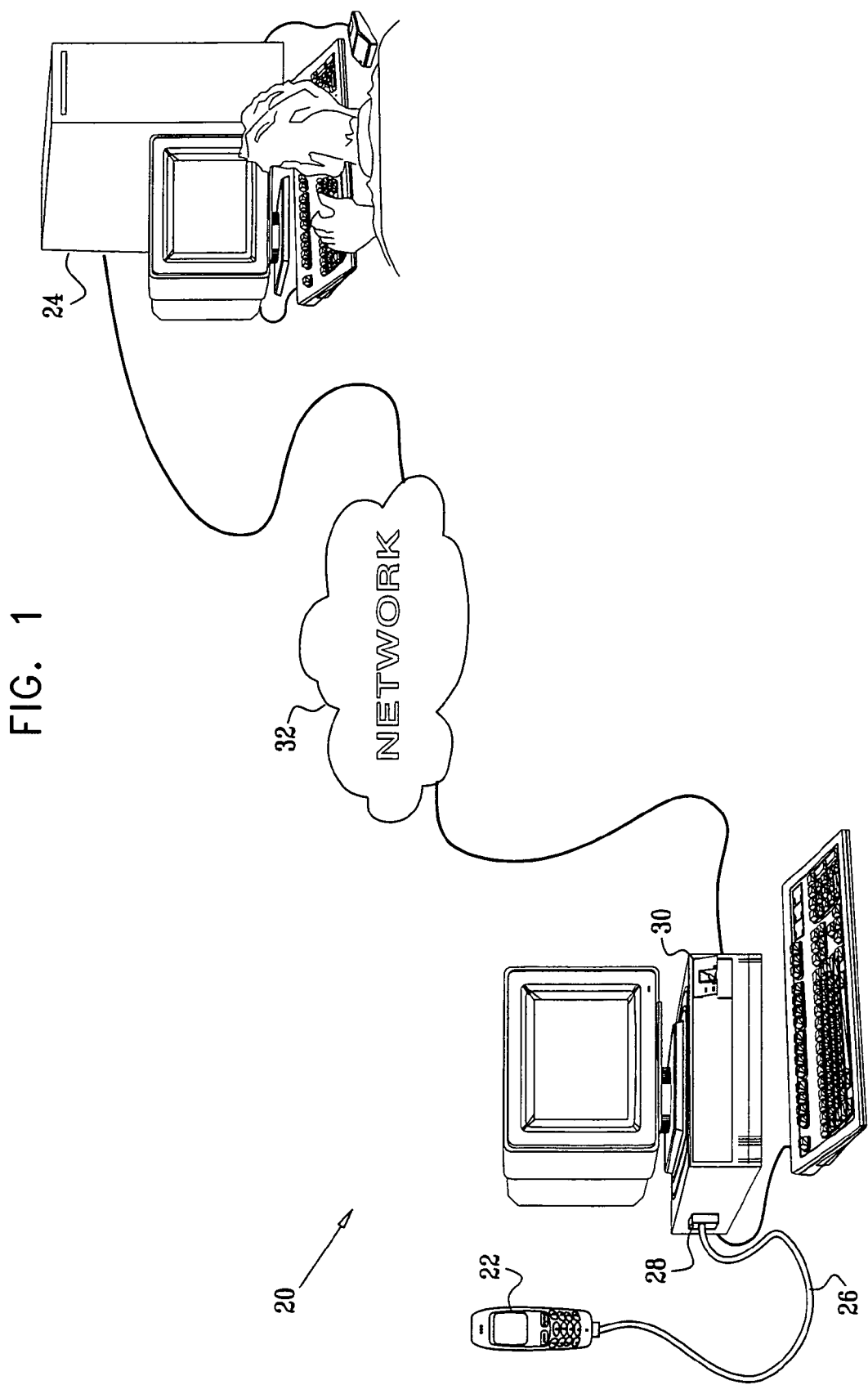
FIG. 1 is a schematic, pictorial illustration showing a computer communication system, in accordance with an embodiment of the present invention.

FIG. 1 is a schematic, pictorial illustration of a computer communication system 20, in accordance with an embodiment of the present invention. System 20 comprises a client computing device 22, running a client application, which communicates with a remote server 24 using an appropriate socket-based connection. For this purpose, client device 22 transmits and receives data over a serial link 26, which connects to a serial port 28 of a proxy host computer 30. (In the description that follows, the terms "client device" and "client" are used interchangeably, as are the terms "host computer" and "host.") Typically, host 30 comprises a general-purpose computer, with a user interface 31 and a display 33.

In the illustrated embodiment, host 30 establishes socket-based communications with server 24 via a network 32, in accordance with requests submitted by client device 22 using the SoS protocol. Alternatively or additionally, host 30 may establish and use such sockets internally, so as to permit client device 22 to communicate with a server application running on the host itself. Although only a single client computing device 22 and a single server are shown in FIG. 1, host 30 may be configured to support multiple client devices on different serial ports, and to carry out socket-based communications with multiple servers simultaneously, both external and internal to the host itself.

Client device 22 is shown in FIG. 1 as a mobile telephone, and serial link 26 is a standard RS-232 link. Such a configuration may be used, for example, in testing a Java™ software implementation that has been written for the mobile telephone. For this purpose, Sun Microsystems (Palo Alto, Calif.) supplies a Technology Compatibility Kit (TCK), which runs as a server application either on host 30 or on remote server 24. The TCK communicates with a corresponding client application on client device 22 using HTTP requests and responses. As noted earlier, HTTP requires an underlying TCP socket. In the present embodiment, the socket is supplied by a SoS server program running on host 30, as described hereinbelow. Other socket-based applications and upper-level protocols may be supported in like manner.

The principles and methods described herein are applicable not only to mobile telephones and Java applications, but to other types of client devices and application environments, as well. For example, client device 22 may comprise a personal digital assistant (PDA) or an embedded computing system, or substantially any other sort of computing device that is required to carry out client/server communications over a serial link. Similarly, serial link 26 may comprise a Universal Serial Bus (USB) link or substantially any other type of serial communication link that is known in the art. Although embodiments of the present invention are described herein with particular reference to Java applications, such as the above-mentioned TCK application, the principles of the present invention may likewise be applied, mutatis mutandis, to socket-based applications of other types.

Figure 2:
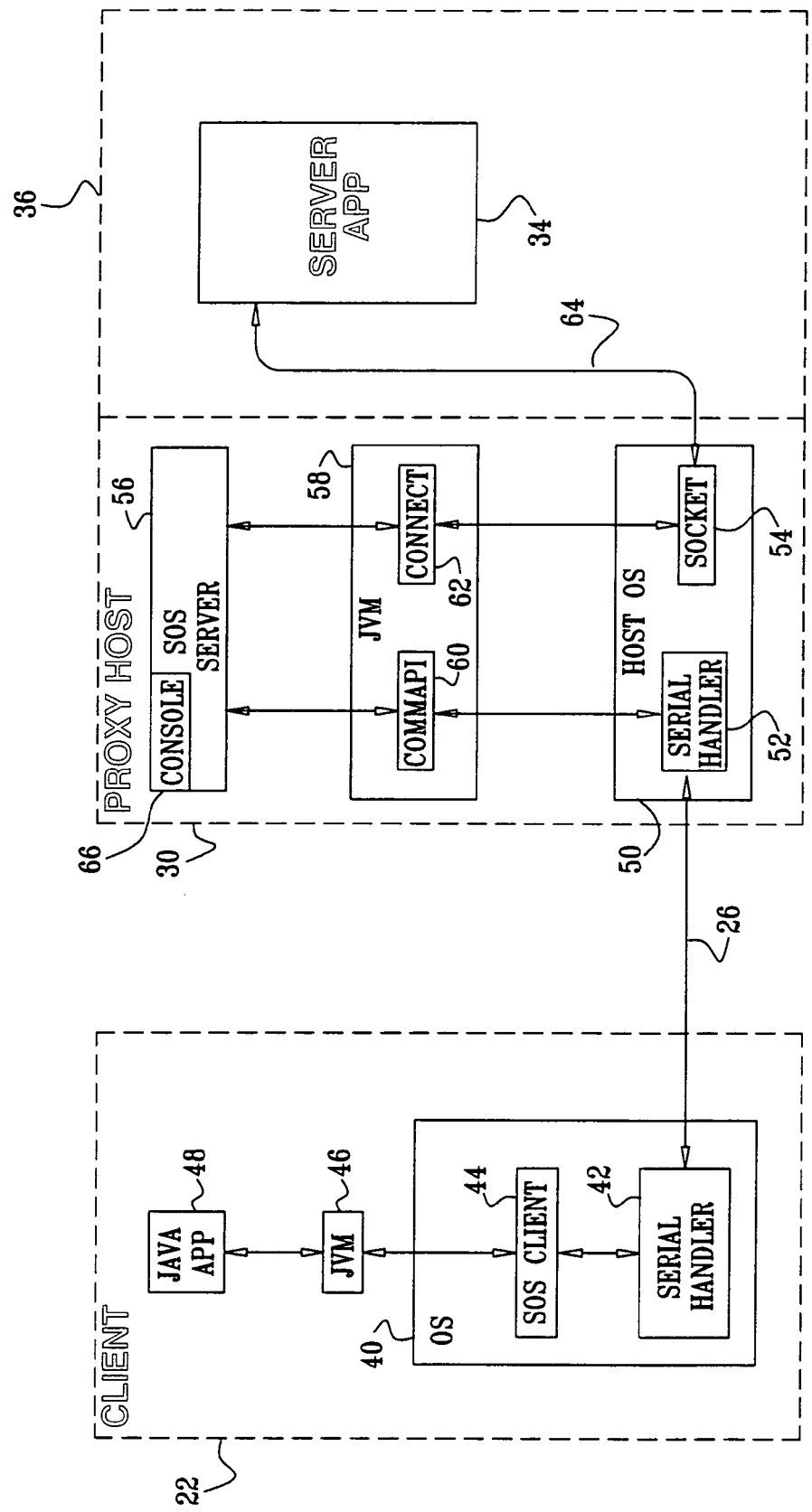
FIG. 2 is a block diagram that schematically illustrates program components running on a client device and on a host computer, in accordance with an embodiment of the present invention.

FIG. 2 is a block diagram that schematically illustrates software components on client 22 and host 30 that are used in implementing the SoS protocol and functionality, in accordance with an embodiment of the present invention. In this example, SoS is used to support communications between a Java client application 48 running on client 22 and a server application 34 running on a server 36, such as the above-mentioned TCK client and server components. As noted earlier, server 36 may be remote server 24, or it may be a server process running on host 30 itself.

Client device 22 runs a native operating system (OS) 40, which comprises a serial handler 42 and a SoS client 44. Serial handler 42 handles low-level communications over serial link 26, using conventional buffered read and write commands. For example, the serial handler may read bytes of data from link 26 in response to the getchar( ) command, and may write bytes to link 26 in response to the putchar( ) command, as is known in the art. SoS client 44 handles the higher-level functions associated with socket-based communications. These functions are typically invoked by client application 48 by means of a socket application programming interface (API), which is provided by a Java Virtual Machine (JVM) 46. In the Java context, such an API might be provided by the MIDP (Mobile Information Device Profile) layer of the JVM. In devices known in the art, which support a full communication protocol stack, invocation of the socket API causes the operating system of the client device to use its networking protocol stack to establish a socket directly with server 36. In the present embodiment, however, the functionality of the socket API is altered so as to invoke SoS client 44, and thus to transfer the burden of actually creating the socket from OS 40 of client device 22 to host 30.

Host 30 runs a host operating system (host OS) 50, such as Windows® or UNIX®. The host OS includes a serial handler 52, which is similar to serial handler 42. The host OS also includes a networking protocol stack 54, which provides full socket support, as is known in the art. To perform its proxy function, host 30 runs a SoS server program 56. In the present example, the SoS server is assumed to be written as a Java application, and thus runs over a JVM 58. The JVM provides the server program with the required APIs, including a communication API (commAPI) 60 for reading to and writing from serial handler 52, and a connect API 62 for invoking socket-related functions of protocol stack 54. These functions include opening, closing and using connections, such as a TCP connection 64, with server application 34. Although Java is convenient for the present purposes, however, alternative server implementations are also possible, as will be apparent to those skilled in the art.

Optionally, SoS server 56 comprises a console component 66, which communicates with user interface 31 and display 33 (FIG. 1). The console component permits a user of host 30 to configure functions of the SoS server, such as serial port assignments. It also permits data received over serial link 26 to be output directly to display 33. For example, in the case of the above-mentioned TCK package, client application 48 may use a printf( ) command to print out debug data that are generated during testing using the package. The printf( ) command on client 22 directs the debug data to serial handler 42, which passes the data over link 26, via serial handler 52, to console component 66. The console component outputs the data to display 33. Other channels of this sort, which bypass the socket-oriented functions of SoS server 56, may similarly be provided.

The software enabling client 22 and host 30 to perform the functions described herein may be downloaded to the client and/or host in electronic form, over a network, for example, or it may alternatively be provided on computer-readable storage medium, such as CD-ROM, DVD or non-volatile memory.

FIG. 3 is a flow chart that schematically illustrates a method for socket-based communication between client 22 and server 36, in accordance with an embodiment of the present invention. Client application 48 invokes the socket API provided by JVM 46 in order to establish a connection with server application 34, at a connection step 70. For example, the client application may submit a HTTP request directed to the server application, which would normally cause the client operating system to open a TCP connection to server 36. In response to the socket API call in client 22, however, JVM 46 passes the request from application 48 to SoS client 44, which uses the services of SoS server 56 on host 30 in establishing the connection, as described hereinbelow. Similarly, once the connection is established, requests by application 48 to send and receive data over the connection are handled by SoS client 44 via host 30. The operation of SoS client 44 and of host 30 in establishing and maintaining such connections is transparent to client application 48 and to server application 34.

SoS client 44 encapsulates the message received from application 48 in a packet in accordance with the SoS protocol, at an encapsulation step 72. To reduce overhead on link 26, the SoS protocol provides that messages be encapsulated in accordance with a simple, predetermined packet format. Typically, the packet comprises the following fields:

Sync byte—predetermined pattern enabling SoS server 56 to recognize the beginning of a new packet.

Packet length—typically 1 byte, permitting packets up to 255 bytes long. Alternatively, a larger packet length field can be used to permit longer packets to be transmitted.

Type—typically 1 byte, for protocol control, indicating whether the present packet is a control message or contains data. An exemplary set of control messages is described below.

Connection ID—typically 1 byte, uniquely identifies each socket connection, so that client 22 may open multiple sockets simultaneously and distinguish the responses received on different sockets.

Port ID (optional)—to identify the port for which the server socket is being opened.

Segment number—When a message exceeds the maximum packet length (255 bytes), it may be segmented into multiple fragments, indicated by the segment number. To reduce overhead, the segment number and connection ID may be shortened and combined into a single 1-byte field.

Argument—data of varying length. Messages generated by application 48, such as HTTP requests and responses, may simply be inserted byte by byte into the argument (payload) of the packet.

CRC (cyclic redundancy code)—error detection code, typically 2 bytes.

In order to reduce overhead still further, if serial link 26 operates in half-duplex mode (as is commonly the case), the connection ID and segment number fields may be replaced by a running, 7-bit packet sequence number, plus a segmentation bit indicating whether the current packet is the final segment in the message, or further segments are to follow. Alternative header fields will be apparent to those skilled in the art.

SoS client 44 passes the packet to serial handler 42, at a packet transmission step 74. Typically, the SoS client uses the putchar( ) command, or its equivalent, to write the packet byte-by-byte to the serial handler, which transmits the bytes over link 26 to host 30. SoS client 44 then waits for a response from the host.

If client OS 40 provides only a single thread for use by JVM 46 and application 48, the application (and possible other Java functions) may be blocked while the client waits for a response to be returned by host 30. In order to permit application 48 to continue running while it waits for the response, the application or the JVM may be configured to periodically poll serial handler 42 for data from host 30. If no response is received within a predetermined period, SoS client 44 may retransmit the packet. Typically, if no response is received after certain number of retransmission attempts, such as three retransmission attempts, the SoS client returns an exception to application 48.

Additionally or alternatively, in order to relieve client 22 of the burden of handling timeouts, SoS server 56 on host 30 may initiate a challenge/response routine at regular intervals, for example, once every 500 ms, when no other packets have been transmitted during the preceding period. Client 22 must respond to every message sent by host 30, in order to permit the host to verify that the connection is alive. This routine may make use of the following packet types (specified in the packet "Type" field mentioned above):

DATA—Message containing a request or other data sent from client to host or from host to client.

ACK—Response to message that was received in acceptable form.

ERR—Response to message in which an error was detected (such as a CRC error).

CHAL—Challenge sent from host to client to verify live connection.

NACK—Response to challenge by client when there is no other message to send.

The challenge/response routine permits server 56 to recognize socket timeouts when client 22 fails to respond to a challenge. In such cases, server 56 typically closes the socket. Application 48 may be configured to recognize that the socket has been closed and to decide how to proceed in this event, for example, by re-opening the socket. Serial handlers 42 and 52 are generally capable of detecting and reporting low-level communication timeouts independently, by means of signals sent and received over link 26.

Returning now to FIG. 3, SoS server 56 listens for incoming data from serial handler 52, using API 60. Upon receiving a data packet, SoS server 56 parses the fields in the packet, in accordance with the packet structure described above, at a packet parsing step 76. Typically, the SoS server checks the packet syntax and CRC, and discards packets that contain errors.

When the SoS server receives a legal packet without errors, the action that it takes depends on the packet contents. When the message from client 22 is a request to open a connection to server application 34, SoS server 56 invokes API 62 in order to request that connection 64 be opened, at a connection request step 78. Connection 64 may be opened either over network 32 (FIG. 1) to remote server 24, or internally within host 30, depending on where the target server application is running. For TCP connections over network 32, for example, host OS 50 exchanges the conventional three-way TCP handshake with server 24.

If host OS 50 is unable to open the desired connection, it informs SoS server 56, which sends a failure message over serial link 26 to client 22, at a failure response step 80. SoS client 44 then returns the appropriate exception to client application 48.

On the other hand, when the connection to server application 34 is established successfully, the connection may be used to convey application traffic between server application 34 and client application 48, at a traffic transfer step 82. SoS server 56 maintains a binding between network connection 64 and the connection to client application 48 over serial link 26. The SoS server strips the unneeded protocol headers from packets that it receives over connection 64 from server application 34, and then encapsulates the payloads in the arguments of packets that it creates in accordance with the SoS protocol described above. (For example, if client application 48 and server application 34 communicate using HTTP, SoS server 56 will strip the protocol headers, such as the IP and TCP headers, that precede the HTTP header, but will encapsulate the HTTP headers in the SoS packets along with the payload data.) SoS client 44 parses the SoS packets and delivers the contents to client application 48. Similarly, when the SoS server receives packets from client 22 over serial link 26, it adds appropriate network (IP) and transport (TCP) headers to the payloads contained in the arguments of these packets, and transmits the complete packets over connection 64 to server application 34. As noted above, the binding, encapsulation and parsing functions performed by SoS server 56 are transparent to both the client and server applications.

Whereas the description above has dealt with opening sockets on server 36 at the request of client 22, the methods of the present invention may be extended in a straightforward manner to support opening of server sockets on the client device. In this case, applications running on other computers can connect to an open and waiting server socket on the client device.

Although for convenience and clarity, the embodiments described above make reference to a certain implementation environment, including particular devices types, programming languages and network protocols, the principles of the present invention are similarly applicable in other environments, as will be apparent to those skilled in the art. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method comprising:
   coupling a client device to communicate with a host computer over a serial link, wherein the serial link enables the client device to communicate with the host computer without using a network connection;
   the client device sending a request to the host computer over the serial link to request the host computer to open a proxy network connection for communication between the client device and a server computer;
   in response to the request, the host computer creating a network socket for communication with the server computer, so as to establish the proxy network connection via the network socket; and
   conveying data between the client device and the server computer using the serial link and the proxy network connection, wherein the method enables the client device to communicate with the server computer through a network without opening a network connection on the client device.

2. The method according to claim 1, wherein creating the network socket comprises creating a Transmission Control Protocol (TCP) socket.

3. The method according to claim 2, wherein conveying the data comprises conveying a Hypertext Transfer Protocol (HTTP) packet through the TCP socket.

4. The method according to claim 2, wherein conveying the data between the client device and the server computer comprises the client device transmitting and receiving data over the serial link without using a TCP stack on the client device.

5. The method according to claim 1, wherein the method requires no more than a single program thread to run on the client device.

6. The method according to claim 1, wherein conveying the data between the client device and the server computer comprises the client device transmitting and receiving data over the serial link without using a networking protocol stack on the client device.

7. The method according to claim 1, wherein the serial link comprises one of:
   an RS-232 link;
   a Universal Serial Bus (USB) link.

8. The method according to claim 1, wherein conveying the data between the client device and the server computer using the serial link and the proxy network connection comprises:
   the client device sending first data to the host computer over the serial link;
   the host computer forwarding the first data to the server computer over the proxy network connection;
   the host computer receiving second data from the server computer over the proxy network connection; and
   the host computer forwarding the second data to the client device over the serial link.

9. Apparatus for communication, comprising:
   a client computing device, which comprises a first serial port; and
   a host computer, which comprises a second serial port, wherein the host computer is coupled to the client computing device by a serial link between the second serial port and the first serial port;
   wherein the client computing device is configured to send a request to the host computer over the serial link to request the host computer to open a proxy network connection for communication between the client computing device and a server computer, wherein the request is sent over the serial link without using a network connection between the client computing device and the host computer;

wherein the host computer is configured to:
in response to the request, create a network socket for communication with the server computer, so as to establish the proxy network connection via the network socket;
receive first data sent over the serial link from the client computing device;
forward the first data to the server computer over the proxy network connection;
receive second data from the server computer over the proxy network connection; and
forward the second data to the client computing device over the serial link.

10. The apparatus according to claim 9, wherein creating the network socket comprises creating a Transmission Control Protocol (TCP) socket.

11. The apparatus according to claim 10, wherein the first data received over the serial link from the client computing device comprises a Hypertext Transfer Protocol (HTTP) packet.

12. The apparatus according to claim 10, wherein the client computing device is configured to send the first data to the host computer over the serial link without using a TCP stack on the client computing device.

13. The apparatus according to claim 9, wherein the client computing device is configured to send the first data to the host computer and received the second data from the host computer using a single program thread running on the client computing device.

14. The apparatus according to claim 9, wherein the client computing device is configured to send the first data to the host computer over the serial link without using a networking protocol stack on the client computing device.

15. A computer-readable storage medium for use on a client computing device, wherein the client commuting device is adapted to be connected by a serial link to a host computer, and wherein the computer-readable storage medium stores program instructions readable by the client computing device and executable by the client computing device to:
receive a first request to open a network connection to a server computer from a client application executing on the client computing device;
in response to the first request, send a second request to the host computer over the serial link to request the host computer to open a proxy network connection for communication between the client computing device and the server computer, wherein the request is sent over the serial link without using a network connection between the client computing device and the host computer;
receive data addressed to the server computer from the client application; and send the data to the host computer over the serial link, wherein the host computer is configured to forward the data to the server computer over the proxy network connection.

16. The computer-readable storage medium according to claim 15, wherein the data addressed to the server computer comprises a Hypertext Transfer Protocol (HTTP) packet.

17. The computer-readable storage medium according to claim 15, wherein the instructions cause the client computing device to run the client application and to send the second request using a single program thread running on the client device.

18. The computer-readable storage medium according to claim 15, wherein the instructions cause the client computing device to send the data over the serial link without using a networking protocol stack on the client computing device.

19. The computer-readable storage medium according to claim 15, wherein the instructions cause the client computing device to send the data over the serial link without using a Transmission Control Protocol (TCP) stack on the client computing device.

20. A computer-readable storage medium for use on a host computer, wherein the host computer is adapted to be connected by a serial link to a client computing device, and wherein the computer-readable storage medium stores program instructions readable by the host computer and executable by the host computer to:
receive, over the serial link, a request from the client computing device to open a proxy network connection for communication between the client computing device and a server computer, wherein the request is received over the serial link without using a network connection between the host computer and the client computing device;
in response to the request, create a network socket for communication with the server computer, so as to establish the proxy network connection via the network socket;
receive first data sent over the serial link from the client computing device;
forward the first data to the server computer over the proxy network connection;
receive second data from the server computer over the proxy network connection; and
forward the second data to the client computing device over the serial link.

21. The computer-readable storage medium according to claim 20, wherein the instructions cause the host computer to create the network socket by creating a Transmission Control Protocol (TCP) socket.

22. The computer-readable storage medium according to claim 21, wherein the first data received over the serial link from the client computing device comprises a Hypertext Transfer Protocol (HTTP) packet.

* * * * *

UNITED STATES PATENT AND TRADEMARK OFFICE
CERTIFICATE OF CORRECTION

PATENT NO. : 7,529,812 B2 Page 1 of 1
APPLICATION NO. : 11/011432
DATED : May 5, 2009
INVENTOR(S) : Jeremy Hoyland et al.

It is certified that error appears in the above-identified patent and that said Letters Patent is hereby corrected as shown below:

In the Claims:

Claim 15, col. 9, line 39, please change "commuting" to "computing".

Signed and Sealed this

Fourth Day of August, 2009

JOHN DOLL
*Acting Director of the United States Patent and Trademark Office*